United States Patent

Olashaw et al.

[11] 3,924,161
[45] Dec. 2, 1975

[54] ELECTRICAL SWITCHBOARD WITH INSULATED, ISOLATED BUS

[75] Inventors: William Francis Olashaw, Plainville; Roger Thomas Wilbur, Bristol, both of Conn.

[73] Assignee: General Electric Company, Schenectady, N.Y.

[22] Filed: Aug. 26, 1974

[21] Appl. No.: 500,526

[52] U.S. Cl. ............ 317/120; 174/71 B; 174/138 F
[51] Int. Cl.² ........................................ H02B 1/20
[58] Field of Search ........... 317/119, 120; 174/70 B, 174/71 B, 72 B, 99 B, 138 F

[56] References Cited
UNITED STATES PATENTS

| | | |
|---|---|---|
| 3,148,312 | 9/1964 | Fouse ................................. 317/120 |
| 3,855,504 | 12/1974 | Olashaw ........................... 174/71 B |

FOREIGN PATENTS OR APPLICATIONS

| | | | |
|---|---|---|---|
| 527,930 | 10/1940 | United Kingdom ............ 174/138 F |

Primary Examiner—Gerald P. Tolin
Attorney, Agent, or Firm—R. A. Cahill; W. C. Bernkopf; F. L. Neuhauser

[57] ABSTRACT

An electrical switchboard includes insulative members to isolate the horizontal and vertical busbars from the accumulation of dust, moisture, and other foreign matter, which can contribute to electrical faults and to protect personnel servicing the switchboard from electrical shock.

4 Claims, 5 Drawing Figures

ELECTRICAL SWITCHBOARD WITH INSULATED, ISOLATED BUS

BACKGROUND OF THE INVENTION

In an electrical switchboard construction, it is current practice, even for high current ratings, to insulatively mount the busbars in essentially exposed fashion in the rear section of the switchboard. The only isolation afforded these current carrying parts is that provided by the switchboard enclosure itself. Electrically insulative members are used, for the most part, to increase the oversurface clearance between conductive parts of different electrical potentials. This accessibility of these busbars leaves them open to the accumulation of dust, the build-up of moisture, and the inadvertent introduction of foreign objects, any one of which can precipitate an electrical fault. The busbars are equally accessible to inadvertent contact by personnel called upon to service the switchboards. In some situations, it is not convenient to deenergize the switchboard for servicing, and thus it is imperative that contact with live bus be avoided.

It is accordingly an object of the present invention to provide an improved electrical switchboard wherein the busbars thereof are effectively insulated and isolated to prevent electrical faults, and yet are conveniently accessible for servicing by maintenance personnel in relation safety from hazardous shock.

Still another object of the invention is to provide an electrical switchboard of the above character which is practical in design, convenient to assemble and safe to operate and maintain.

Other objects of the invention will in part be obvious and in part appear hereinafter.

SUMMARY OF THE INVENTION

In accordance with the present invention, there is provided in an electrical switchboard of improved design to afford greater protection for personnel maintaining the switchboard and to decrease the potential for electrical faults due to the accumulation of dust, built-up moisture, and accidental introduction of foreign objects. To this end, the vertical busbars are enveloped in insulative panels over their entire length to limit access both from the front through switchboard compartments and from the rear where load connections are made. The horizontal busbars, which bring electrical power to the vertical busbars are likewise isolated such that access thereto is limited.

More specifically, the electrical connections of the horizontal busbars respectively to correspondingly phased vertical busbars are effected at their intersections using a bolted joint. The bolts utilized to perfect these joints are individually isolated by insulative caps threaded onto washers held captive under the bolt heads. Thus, the bolt heads, which are live when the horizontal busbars are energized, are completely inaccessible to external contact. Yet, the caps are readily removable to expose the bolt heads for joint maintenance.

In addition, the horizontal busbars, mounted to the rear of the vertical busbars, are electrically isolated along their entire lengths by insulators juxtaposed their rear surfaces and upper and lower edges. At least those insulators for the rear surfaces of the horizontal busbars are in intimate contact with the busbars for good heat transfer characteristics, thus insuring that the horizontal busbars will run cool. In one embodiment of the invention, the horizontal busbars are coated with an insulative material to afford electrical isolation and good heat transfer. Alternatively, an insulative strip is cemented to the rear surfaces of the busbars. Additional insulative strips are mounted to extend along the upper and lower edges of the horizontal busbars, thus affording rather complete electrical insulation thereof. Where the horizontal busbars terminate in particular switchboard sections, additonal insulative members are provided to isolate these terminations as well.

The invention accordingly comprises the features of construction, combination of elements, and arrangement of parts which will be exemplified in the construction hereinafter set forth, and the scope of the invention will be indicated in the claims.

DESCRIPTION OF THE DRAWINGS

For a fuller understanding of the nature and objects of the invention, reference should be had to the following detailed description taken in connection with the accompanying drawings, in which.

Like reference numerals, refer to corresponding parts throughout the several views of the drawings.

DETAILED DESCRIPTION

Figure 1:
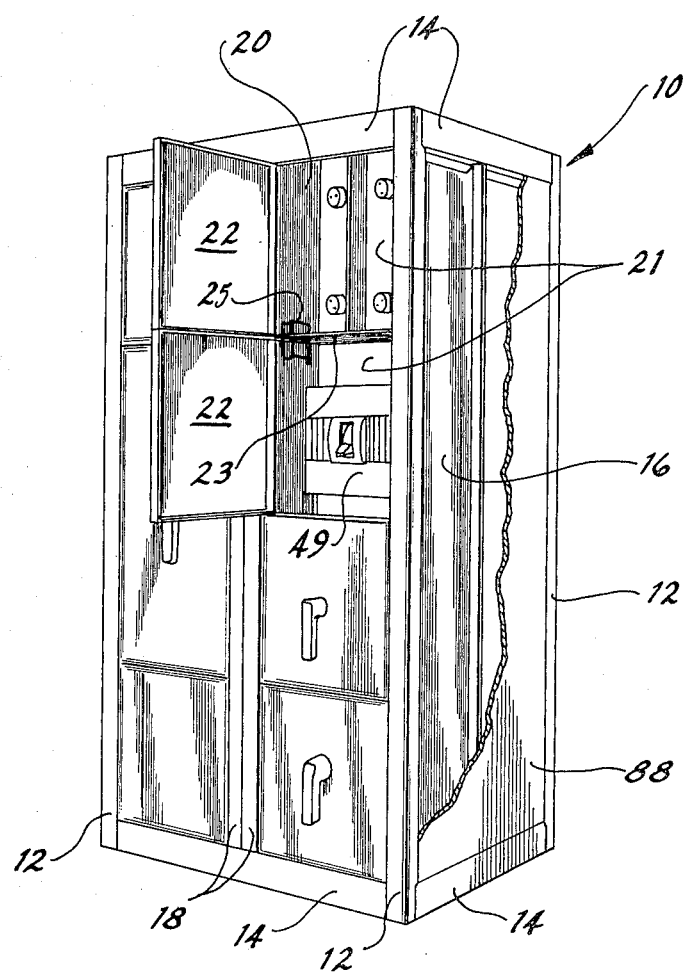
FIG. 1 is a perspective view of an electrical switchboard embodying the present invention.

The present invention is embodied in an electrical switchboard, generally indicated at 10 in FIG. 1, which includes a rectangular steel framework consisting of corner posts 12, interconnecting horizontal beams 14, side mounting partitions 16, and a pair of intermediate structural members each consisting of an integral vertical post 18 and mounting partition 20. Partitions 20 divide the switchboard cabinet into two vertical switchboard sections of stacked compartments 21 to which access is afforded by doors 22. Horizontal barrier sheets 23 mounted by brackets 25 attached to the mounting partitions 20 and 16 devide the switchboard sections into the stacked compartments.

Figure 2:
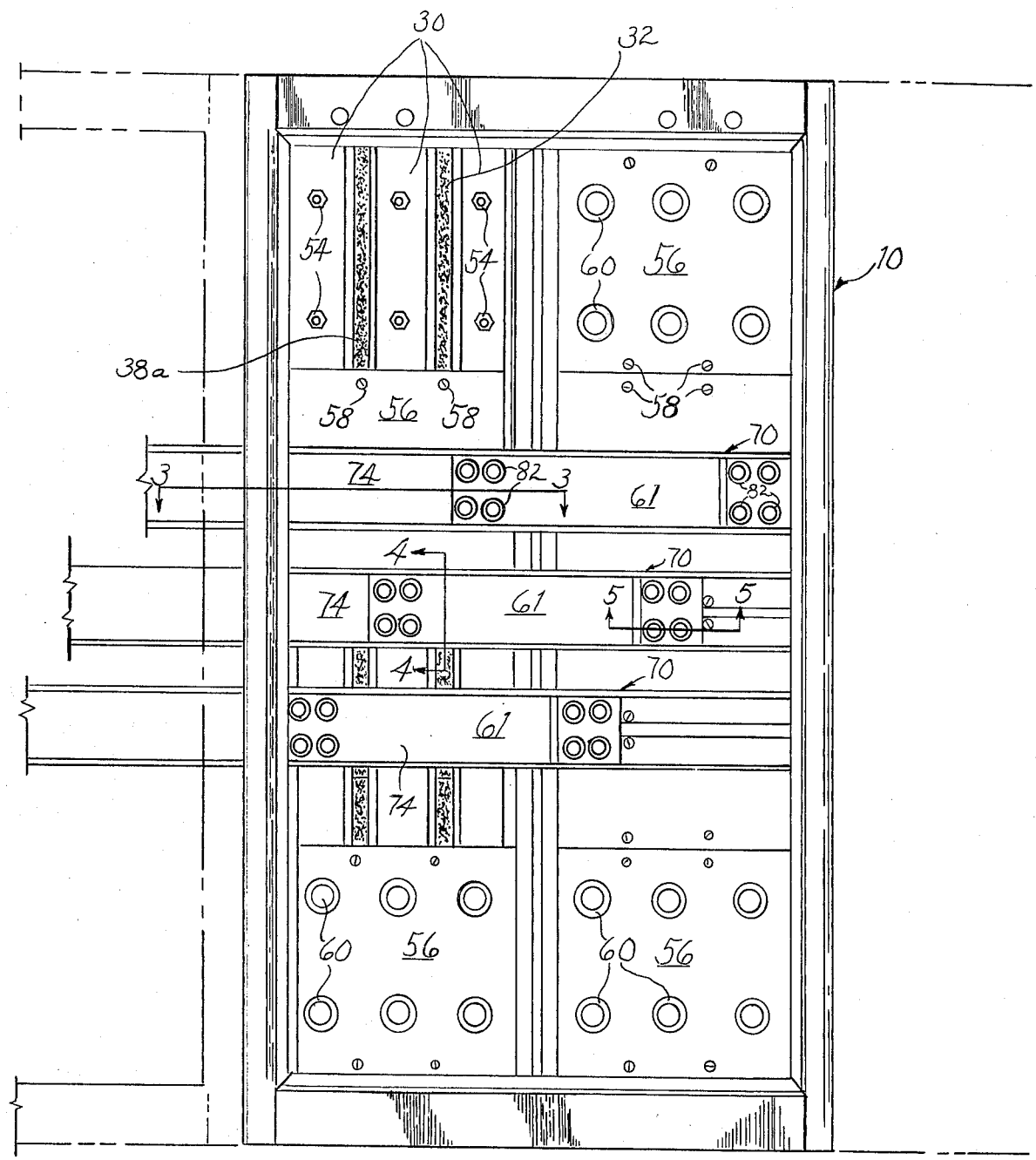
FIG. 2 is a rear elevational view of one of the switchboards of FIG. 1.
Figure 3:
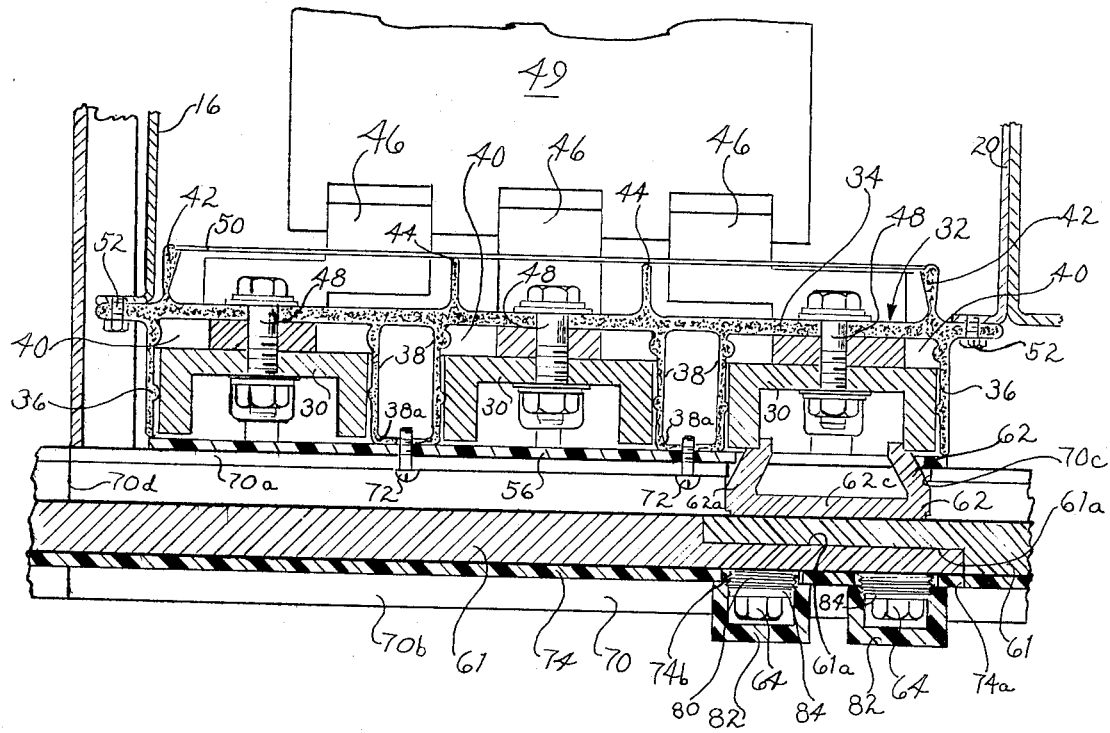
FIG. 3 is a sectional view taken along line 3—3 of FIG. 2.

Referring to the back view of the switchboard 10 in FIG. 2, each switchboard section includes three vertical busbars 30 mounted to the switchboard framework by modular insulative mounting panels 32 arranged end to end for the entire height of the switchboard section. These insulative mounting panels are fully disclosed in copending application Ser. No. 401,244, filed Sept. 27, 1973 and assigned to the assignee of the instant application. As seen in FIG. 3, these mounting panels, formed of structurally rigid, electrically insulative material, such as a glass fiber polyester, each include a base plate 34 having a width conforming to the width of a switchboard section and a length conforming to the height of a particular switchboard compartment. Outstanding from the back side of base plate 34 are integrally formed, outboard ribs 36 and two pairs of intermediate or inboard ribs 38 running coextensively with the modular lengths of the individual mounting panels. The paired intermediate ribs are interconnected at their ends opposite from base plate 34 by coextensive bridging segments 38a. As seen in FIGS. 2 and 3, ribs 36 and 38 cooperate to define, in conjunction with base plate 34, three channels 40, each accompanying one of the elongated vertical busbars 30, shown having U-shaped cross-sections but may be of other cross-sectional configurations.

A pair of outboard ribs 42 and a pair of intermediate ribs 44 are integrally formed in outstanding relation with base plate 34 on the front side thereof. These ribs likewise run coextensively with the length of a mounting panel 32 and serve to define channels accommodating the line and load straps for the electrical devices accommodated in the switchboard compartments. Thus, as seen in FIG. 3, line straps 46, respectively electrically connected to the vertical busbars by bolts 48 extend through apertures in the mounting panels into these channels for electrical connection to the line terminals of an electrical device 49. Outboard ribs 42 are flared adjacent their free ends and recessed to provide elongated seats accommodating the lateral edge portions of insulative barrier sheets 50 serving to effectively shield personnel from the electrical device line and load straps. Sheets 50 may be held in place using a suitable adhesive, or the equivalent.

Still referring to FIG. 3, the marginal edge portions of the modular mounting panels are pre-formed with bolt holes at regular intervals to receive suitable fasteners, such as self-tapping screws 52, for mounting the mounting panels to the laterally turned, flanged end portions of the framework mounting partitions 16 and 20. The thus mounted mounting panels extend end to end in each cabinet section throughout the entire height of the switchboard 10, as seen in FIG. 2. The vertical busbars 30 are disposed in channels 40 and secured in place by bolts 54 clamping the vertical bus to the mounting panels. Modular insulative barrier sheets 56, secured to the bridging segments 38a of the mounting panels 32 by self-tapping screws 58, or the equivalent, cooperate with panel base plate 34 to effectively envelop and thus isolate the vertical bus from dirt, foreign objects, etc. The potential for electrical faults between vertical bus is reduced, as is the hazard of electrical shock to service personnel. Apertures in the barrier sheets 56 to facilitate access to bolts 48 and 54 to maintain the integrity of the line strap connections to the vertical bus and the physical mounting of the vertical bus are preferably closed by snap-fit plugs 60.

As best seen in FIG. 2, horizontal or main busbars 61 bring electrical power to the vertical busbars 30 of each switchboard section. Electrical connection to the vertical busbars is effected using a conductive U-shaped bracket 62, best seen in FIG. 3. The convergent legs 62a of bracket 62 are formed having notched ends to seat on inner corners of the rearwardly extending U-shaped vertical busbar legs. The bracket 62 is welded to the vertical busbar to provide a physical, as well as maintenance-free electrical connection therebetween. Bridging portion 62c of bracket 62 is formed with a plurality of tapped holes for accepting bolts 64, preferably four, mounting and electrically connecting a horizontal busbar 61 thereto. Each horizontal busbar is made up of modular length sections whose terminations are relieved, as indicated at 61a, in complementary fashion, to form a scarf lap joint, which is also secured by bolts 64. It is important to note that the joining of horizontal busbar sections, the electrical connection of a horizontal busbar to a vertical busbar and the physical mounting thereof are effected at the same location, thus greatly simplifying assembly and maintenance. It is also pointed out that the horizontal bar sections may be identically formed of lengths equal to the width of a switchboard section, with one section reversed relative to the other to produce the scarf joint. An essentially linear horizontal bus system with the surfaces of the bus sections lying in respectively common planes is thus achieved.

Figure 4:
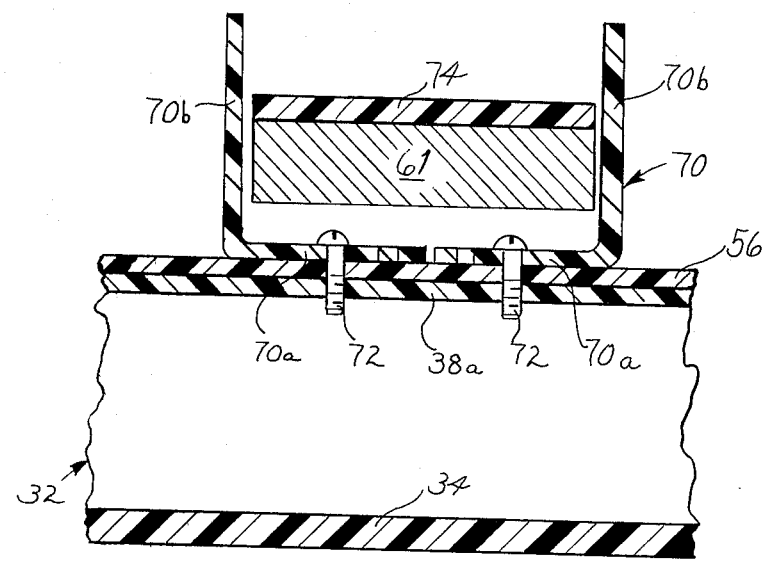
FIG. 4 is a sectional view taken along line 4—4 of FIG. 2.

The linearity of each horizontal busbar 61 facilitates the insulation and isolation thereof in accordance with the present invention. As seen in FIGS. 3 and 4, pairs of elongated, insulative members 70, each L-shaped in cross-section, form channels extending the width of the switchboard cabinet for accommodating the horizontal busbars. One side 70a of each paired member 70 is secured by screws 72 penetrating the bridging segments 38a of the mounting panels 32, thus avoiding exposure of the screw terminations to the vertical bus. The other sides 70b of the paired insulative members provide outstanding sidewalls for the channel accommodating a horizontal busbar 61. The rear surface of each horizontal busbar section is covered by an insulative strip 74, preferably secured in intimate contact therewith by a suitable adhesive to provide good heat transfer characteristics. It is thus seen that the horizontal busbars are effectively enveloped by the insulative members 70, 74 along their lengths between section joints to preclude human contact therewith and to reduce the potential for electrical faults.

At the horizontal busbar section joints, secured by bolts 64, the upper and lower edges of the joint are shielded by the members 70 which extend the full width of the switchboard cabinet. The sides 70a are relieved at 70c (FIGS. 3 and 5) to afford clearance for brackets 62. With two cabinets in side-by-side relation, the ends of members 70 in each cabinet are butted together, as indicated at 70d, to insure continuity of insulation and isolation. Strips 74 also extend into the section joint area, inasmuch as their lengths are preferably established to cover the rear surface of each horizontal busbar section. Thus the junction, indicated at 74a in FIG. 3, between strips 74 applied to joined busbar sections overlies the junction between the rear surfaces of the bus sections. So as not to prejudice the clamping action of bolts 64, the strips are apertured, as indicated at 74b in FIG. 3, such that the bolt clamping pressure is exerted directly on the scarf lap joint terminations of the horizontal busbar sections.

Figure 5:
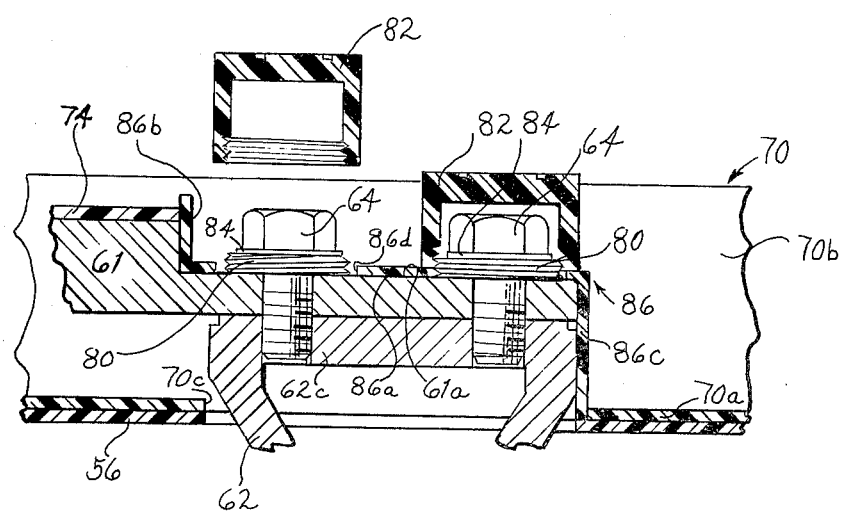
FIG. 5 is a sectional view taken along line 5—5 of FIG. 2.

It will be appreciated that when the horizontal busbars are energized, the heads of bolts 64 become live and thus constitute a shock hazard. To remedy this situation, a special washer 80, best seen in FIG. 5, is captured under the head of each bolt 64. These washers are peripherally threaded to accept an internally threaded insulative cap 82, which, in place, fully isolates and insulates the line bolt heads. Obviously, the caps 82 can be readily screwed off to expose the bolts 64 for convenient joint maintenance. As is conventional, a spring washer 84 is also captured under the head of each bolt 64 to sustain joint pressure despite inadvertent loosening of the bolts.

A final situation, which must be dealt with, is the terminations of the horizontal busbars in a particular switchboard section. Since busbar sections are not joined at these terminations, the strips 74 do not cover the relieved end portions of the terminal busbar sections. To obtain shielding at these terminations, an additional insulative member 86, best seen in FIG. 5, is provided in accordance with the present invention. Each member 86 is essentially Z-shaped having a midsection 86a and a rearwardly extending end section 86b overlying and adhered to the relieved surface portions of the busbar section termination. The other end section 86c extends forwardly to cover the end surface of the busbar section, as well as the portion of bracket 62-exposed between sides 70b of the paired members 70. Member 86 is also apertured, as indicated at 86d, to afford clearance for bolts 64, the heads of which are shielded by caps 82.

From the foregoing description, it is seen that the horizontal and vertical busbars of an electrical switchboard are effectively shielded by the instant invention, both from a physical isolation standpoint and electrical insulation standpoint. Inadvertent physical contact by service personnel with live bus is effectively and rather completely precluded. Moreover the possibility of electrical faults due to accumulated dust, moisture build-up, presence of other foreign objects, etc., is greatly diminished. It will be appreciated that the objects of the invention could also be achieved by coating the rear surface and upper and lower edges of the horizontal busbar sections with an insulative material to serve the purpose of members 70 and strip 74.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. An electrical switchboard having a plurality of compartments for accommodating electrical devices, said switchboard comprising, in combination:

A. a plurality of vertical busbars located just rearwardly of the switchboard compartments;
   B. a plurality of horizontal busbars located rearwardly of said vertical busbars;
   C. joints respectively electrically interconnecting each horizontal busbar to each vertical bus bar at intersections thereof, each joint secured by at least one bolt having a rearwardly accessible head;
   D. individual, insulative caps removable mounted about said head of each said bolt to shield said bolt head;
   E. insulative panels mounted fore and aft of said vertical busbars along their entire lengths to electrically and physically isolate said vertical busbars; and
   F. insulative means including elongated insulative members forming individual channels shielding the upper and lower edges of said horizontal busbars accommodated therein, and insulative strips overlying the rearward surfaces of said horizontal busbars, thereby to electrically and physically isolate said horizontal busbars, wherein said insulative members are each L-shaped in cross-section and physically arranged in pairs to form said channels.

2. The electrical switchboard defined in claim 1, wherein each said horizontal busbar is in the form of plural sections joined end to end, the joined ends of said busbar sections being secured by said joints.

3. The electrical switchboard defined in claim 2, wherein the ends of each said horizontal busbar section are relieved to provide scarf lap joint terminations, and said switchboard further includes an insulative barrier applied to the joint termination of the last one of said horizontal busbar sections in each horizontal busbar run.

4. The electrical switchboard defined in claim 3, wherein said strips and insulative barrier are aperture to afford clearance for said joint bolts.

* * * * *